(12) United States Patent
Chen et al.

(10) Patent No.: US 8,390,944 B2
(45) Date of Patent: Mar. 5, 2013

(54) PHOTOGRAPHING OPTICAL LENS ASSEMBLY

(75) Inventors: Chun-Shan Chen, Taichung (TW); Hsin-Hsuan Huang, Taichung (TW)

(73) Assignee: Largan Precision Co., Ltd., Taichung (TW)

(*) Notice: Subject to any disclaimer, the term of this patent is extended or adjusted under 35 U.S.C. 154(b) by 133 days.

(21) Appl. No.: 13/164,520

(22) Filed: Jun. 20, 2011

(65) Prior Publication Data
US 2012/0154931 A1    Jun. 21, 2012

(30) Foreign Application Priority Data

Dec. 15, 2010    (TW) .............................. 99144096 A

(51) Int. Cl.
*G02B 9/06*    (2006.01)
*G02B 3/02*    (2006.01)

(52) U.S. Cl. ........................................ 359/794; 359/717

(58) Field of Classification Search ................. 359/717, 359/793, 794
See application file for complete search history.

(56) References Cited

U.S. PATENT DOCUMENTS
7,525,741 B1    4/2009    Noda

*Primary Examiner* — Jack Dinh
(74) *Attorney, Agent, or Firm* — Morris Manning & Martin LLP; Tim Tingkang Xia, Esq.

(57) ABSTRACT

A photographing optical lens assembly includes, in order from an object side to an image side, a first lens element with positive refractive power having a convex object-side surface and a convex image-side surface, and a second lens element with positive refractive power having a concave object-side surface and a convex image-side surface. At least one surface of the first lens element is aspheric and two surfaces of the second lens element are aspheric. The photographing optical lens assembly can also include a stop and an image plane. By adjusting the thicknesses of the first lens element and the second lens element as well as the allocation of the stop in the photographing optical lens assembly can effectively reduce the size as well as the sensitivity of the photographing optical lens assembly while gaining superior resolution.

16 Claims, 8 Drawing Sheets

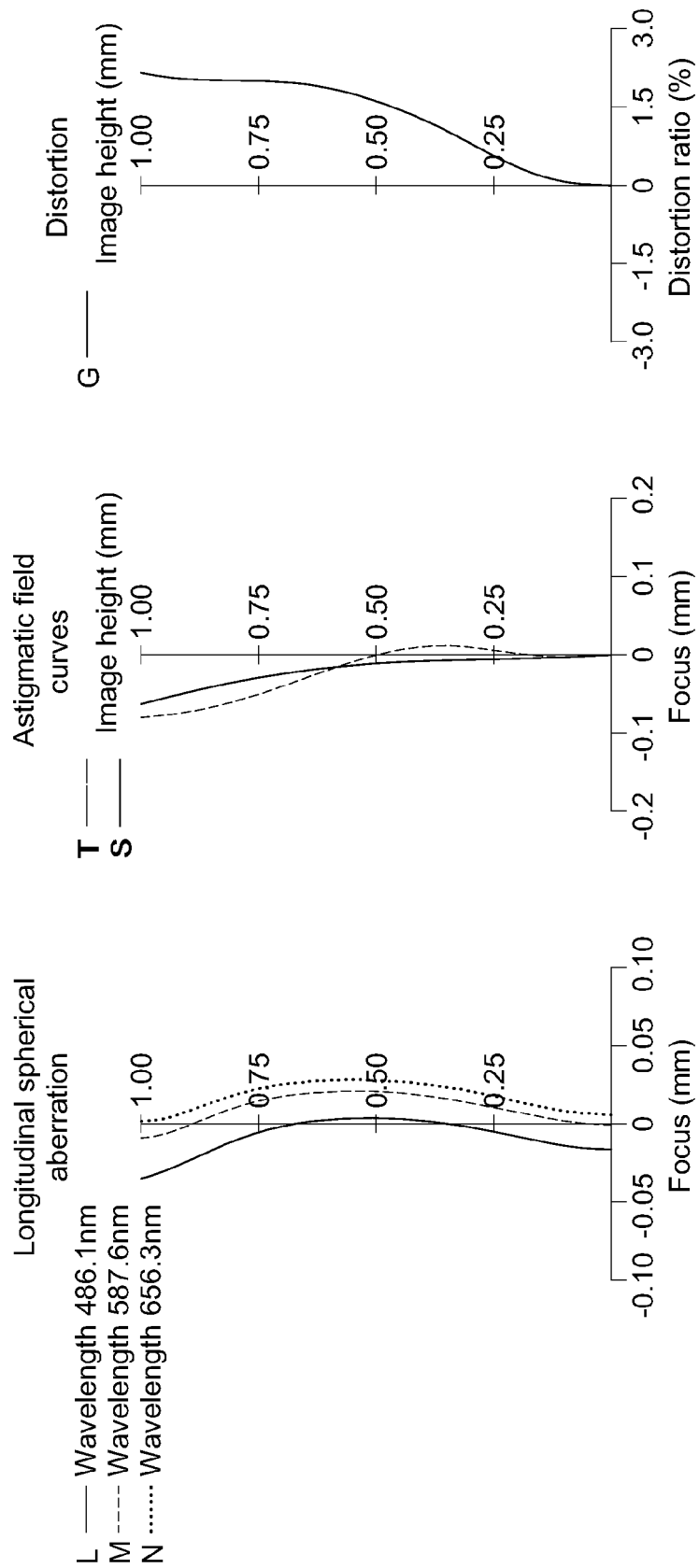

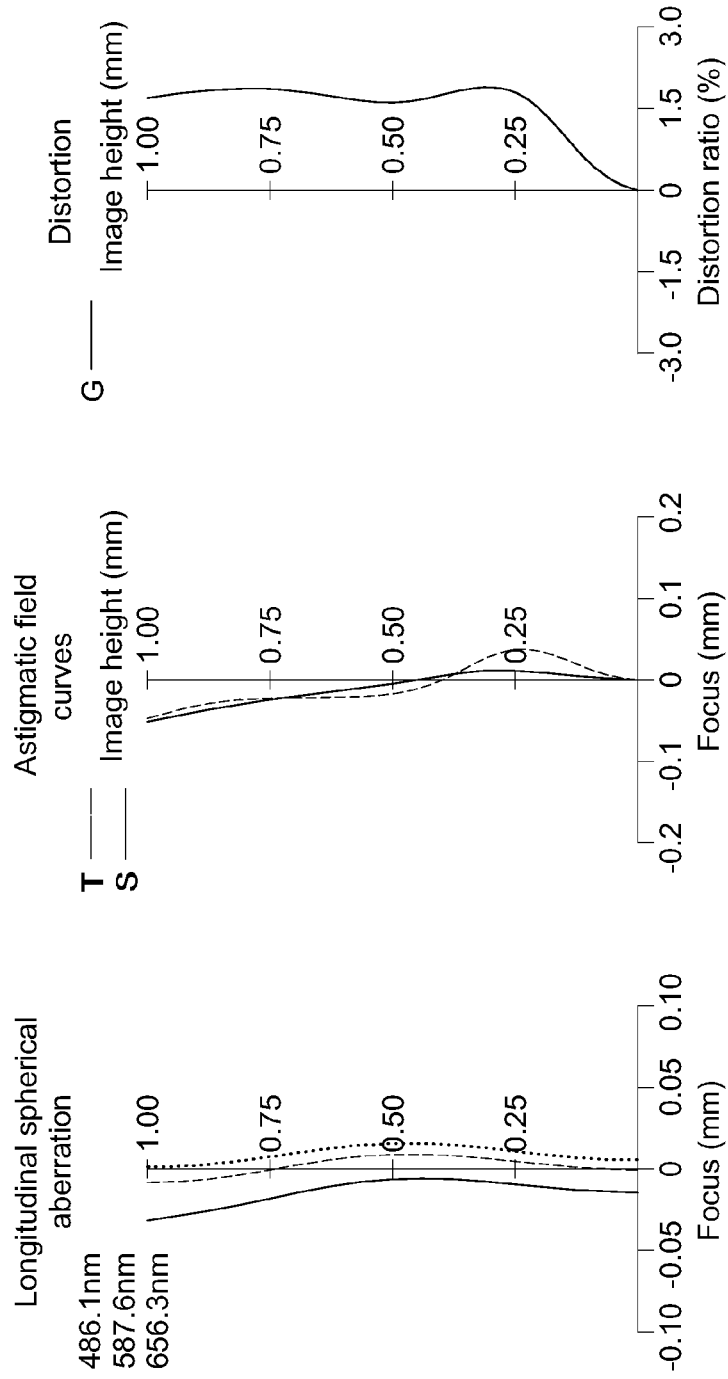

PHOTOGRAPHING OPTICAL LENS ASSEMBLY

CROSS-REFERENCE TO RELATED APPLICATIONS

This non-provisional application claims priority under 35 U.S.C. §119(a) on Patent Application No(s). 099144096 filed in Taiwan, R.O.C. on Dec. 15, 2010, the entire contents of which are hereby incorporated by reference.

BACKGROUND

1. Technical Field

The present disclosure relates to an optical lens assembly, and more particularly to a photographing optical lens assembly.

2. Related Art

In recent years, with the prosperity of photographing optical lens assemblies, the demand for compact photographing cameras boosts exponentially. The photo-sensing device, e.g. a sensor, of an ordinary photographing camera is commonly selected from a charge coupled device (CCD) and a complementary metal-oxide semiconductor (CMOS) device. In addition, as the advancing semiconductor manufacturing technology enables the minimization of the pixel size of sensors and the development of electronic products is heading toward full functionality and getting light, thin, short and small, the standards for the image quality of the photographing optical lens assemblies are rapidly raised.

In consideration of the aberration correction, the lens assembly of a conventional mobile electric device usually consists of three lens elements where the refractive power of the middle lens element is negative and those of the rest of the lens elements are positive. However, although the length of the lens assembly is reduced, the space of the photographing optical lens assembly available for forming image is also reduced. Additionally, the reduced space makes it difficult to incorporate the three lens elements into the photographing optical lens assembly. Therefore, the lens elements must become even thinner. However, when the lens element gets thinner, the uniformity of the lens thickness becomes worse, in terms of lens manufacturing by plastic injection molding.

A photographing optical lens assembly only with two lens elements is provided to effectively shorten the total length of the photographing optical lens assembly and improve the yield rate of the lens elements. For example, U.S. Pat. No. 7,525,741 discloses a two-piece optical lens system for taking image, comprising a first lens element with positive refractive power and a second lens element with negative refractive power in order from the object side to the image side. Although such arrangement enables the two-piece optical lens system to provide images having good resolution, it is difficult to shorten the total optical length of the two-piece optical lens system since the first lens element is a crescent lens having limited refractive power. Therefore, the inventors recognize that there is a need for a photographing optical lens which can be manufactured easily and has short optical length and low sensitivity.

SUMMARY

According to the present disclosure, a photographing optical lens assembly comprises, in order from an object side to an image side: a first lens element with positive refractive power having a convex object-side surface and a convex image-side surface, and a second lens element with positive refractive power having a concave object-side surface and a convex image-side surface. At least one of the object-side and the image-side surfaces of the first lens element are aspheric and the object-side and the image-side surfaces of the second lens element are aspheric. The photographing optical lens assembly further includes a stop and an image plane.

Near an optical axis, the thickness of the first lens element is $CT_1$ and the thickness of the second lens element is $CT_2$. The axial distance between the first lens element and the second lens element is $T_{12}$, the axial distance between the stop and the image plane is SL, the axial distance between the object-side surface of the first lens element and the image plane is TTL, the focal length of the photographing optical lens assembly is f, the Abbe number of the first lens element is $V_1$, and the Abbe number of the second lens element is $V_2$. The photographing optical lens assembly satisfies the following conditions:

$0.25 < CT_2/T_{12} < 0.80$ (Condition 1):

$0.30 < CT_1/f < 0.57$ (Condition 2):

$20.0 < V_1 - V_2 < 45.0$ (Condition 3):

$0.9 < SL/TTL < 1.2$ (Condition 4):

BRIEF DESCRIPTION OF THE DRAWINGS

The present disclosure will become more fully understood from the following detailed description when taken in connection with the accompanying drawings, which show, for the purpose of illustrations only, and thus do not limit other possible embodiments derived from the spirit of the present disclosure, and wherein:

FIG. 1B is a schematic view of longitudinal spherical aberration curves when the lights having wavelengths of 486.1 nm, 587.6 nm, and 656.3 nm are respectively projected in the photographing optical lens assembly in FIG. 1A;

FIG. 1C is a schematic view of astigmatic field curves when the light having the wavelength of 587.6 nm is projected in the photographing optical lens assembly in FIG. 1A;

FIG. 1D is a schematic view of a distortion curve when the light having the wavelength of 587.6 nm is projected in the photographing optical lens assembly in FIG. 1A;

FIG. 3B is a schematic view of longitudinal spherical aberration curves when the lights having wavelengths of 486.1 nm, 587.6 nm, and 656.3 nm are respectively projected in the photographing optical lens assembly in FIG. 3A;

FIG. 3C is a schematic view of astigmatic field curves when the light having the wavelength of 587.6 nm is projected in the photographing optical lens assembly in FIG. 3A;

FIG. 3D is a schematic view of a distortion curve when the light having the wavelength of 587.6 nm is projected in the photographing optical lens assembly in FIG. 3A;

DETAILED DESCRIPTION

Figure 1A:
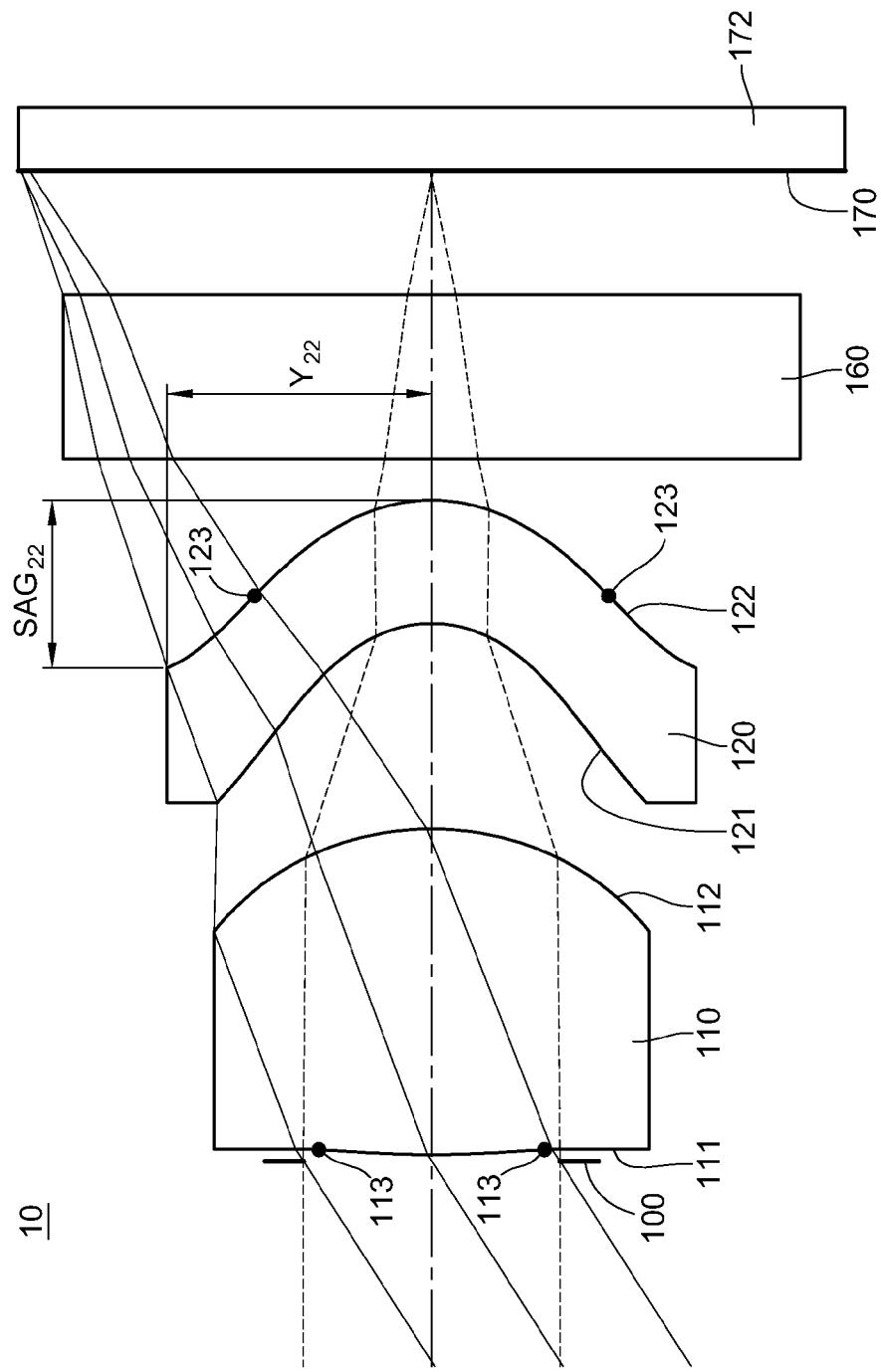
FIG. 1A is a schematic structural view of a first embodiment of a photographing optical lens assembly according to the present disclosure.

One of the embodiments of the photographing optical lens assemblies of the present disclosure is described with FIG. 1A as an example, to illustrate the lens combinations, the configuration relationships and the conditions of the photographing optical lens assemblies that are commonly owned by the embodiments of the disclosure. The differences between the embodiments will be described in detail in embodiments other than the embodiment described in FIG. 1.

Taking FIG. 1A as an example, a photographing optical lens assembly 10, from an object side to an image side along an optical axis (from left to right in FIG. 1A) in sequence, comprises an aperture stop 100, a first lens element 110, a second lens element 120, an infrared filter 160, and an image plane 170.

By having positive refractive power, the first lens element 110 provides partial refractive power of the photographing optical lens assembly 10 for shortening the total optical length of the photographing optical lens assembly 10. The first lens element 110 comprises an object-side surface 111 and an image-side surface 112. At least one of the object-side surface 111 and the image-side surface 112 is aspheric. Moreover, the object-side surface 111 and the image-side surface 112 can be convex to enhance the positive refractive power of the first lens element 110, thereby the total length of the photographing optical lens assembly 10 is shortened further.

The refractive power of the second lens element 120 is also positive, so that the overall positive refractive power of the photographing optical lens assembly is well distributed to the first lens element and the second lens element, and thereby, the sensitivity of the photographing optical lens assembly is reduced. The second lens element 120 comprises an object-side surface 121 and an image-side surface 122. The object-side surface 121 and the image-side surface 122 can be aspheric. Moreover, when the object-side surface 121 is concave and the image-side surface 122 is convex, the astigmatism and the high-order aberration of the photographing optical lens assembly 10 are corrected. The term "total length" of the photographing optical lens assembly 10," as used herein, refers to the axial distance between the object-side surface 111 of the first lens element 110 and the image plane 170.

According to the present disclosure, the total length of the photographing optical lens assembly 10 is shortened since the refractive power of the first lens element 110 is positive and the aperture stop 100 is disposed between the object-side (the left side in FIG. 1A) and the first lens element 110.

In addition, with the arrangement of the photographing optical lens assembly 10, the exit pupil of the photographing optical lens assembly 10 gets away from the image plane 170, such that when the incident light parallel to the optical axis arrives to the image plane, the incident angle of the incident light is approximately perpendicular to the image plane 170. That is, the photographing optical lens assembly 10 has a telecentric feature in the image-side (the right side in FIG. 1A). Therefore, when an image sensor is disposed on the image plane 170, the photo-sensing capability of the image sensor is improved due to the telecentric feature and the possibility of shading occurrences on the image generated by the image sensor is reduced.

Moreover, when the first lens element 110 and the second lens element 120 is made of plastic, the manufacturing cost and the weight of the photographing optical lens assembly 10 are reduced, and it is beneficial to manufacture aspherical lens elements.

The optical imaging system 10 of the present disclosure satisfies the following conditions:

$$0.25 < CT_2/T_{12} < 0.80 \quad \text{(Condition 1)}:$$

$$0.30 < CT_1/f < 0.57 \quad \text{(Condition 2)}:$$

$$20.0 < V_1 - V_2 < 45.0 \quad \text{(Condition 3)}:$$

$$0.9 < SL/TTL < 1.2 \quad \text{(Condition 4)}:$$

Near the optical axis, $CT_1$ is the thickness of the first lens element 110, i.e. the axial distance between the object-side surface 111 and the image-side surface 112, $CT_2$ is the thickness of the second lens element 120, i.e. the axial distance between the object-side surface 121 and the image-side surface 122. $T_{12}$ is the axial distance between the first lens element 110 and the second lens element 120, i.e. the axial distance between the image-side surface 112 and the object-side surface 121, f is the focal length of the photographing optical lens assembly 10, $V_1$ is the Abbe number of the first lens element 110, and $V_2$ is the Abbe number of the second lens element 120, SL is the axial distance between the aperture stop 100 and the image plane 170, TTL is the axial distance between the object-side surface 111 and the image plane 170.

In the photographing optical lens assembly 10, the positive refractive power of the first lens element 110 provides partial refractive power for shortening the total optical length of the photographing optical lens assembly 10. When the second lens element 120 has positive refractive power, the overall positive refractive power of the photographing optical lens assembly 10 is well distributed to the first lens element 110 and the second lens element 120, so that the sensitivity of the photographing optical lens assembly 10 is reduced. Furthermore, the positive refractive power of the first lens element 110 is increased and the total optical length of the photographing optical lens assembly 10 is further shortened when both the object-side surface 111 and the image-side surface 112 of the first lens element 110 are convex. The astigmatism and the high-order aberration of the photographing optical lens assembly 10 are corrected when the object-side surface 121 and the image-side surface 122 of the second lens element 120 are concave and convex, respectively.

When the photographing optical lens assembly 10 satisfies Condition 1, the thickness of the second lens element as well as the axial distance between the first lens element and the second lens element are proper, thereby an optimal balance between reducing the volume and improving the image quality of the photographing optical lens assembly is achieved.

Preferably, the photographing optical lens assembly 10 satisfies $0.45<CT_2/T_{12}<0.65$. When the photographing optical lens assembly 10 satisfies Condition 2, the first lens element has a proper thickness to overcome the difficulties in manufacturing and a higher yield rate of the lens elements is achieved.

When the photographing optical lens assembly 10 satisfies Condition 3, the chromatic aberration of the photographing optical lens assembly 10 is corrected. Preferably, the photographing optical lens assembly 10 satisfies $30.0<V_1-V_2<42.0$. When the photographing optical lens assembly 10 satisfies Condition 4, a good balance between pursuing the telecentric feature and a wide field of view of the photographing optical lens assembly is achieved.

In the photographing optical lens assembly 10 according to the present disclosure, preferably, the object-side surface 111 has at least one inflection point, such as the first inflection point 113, and the image-side surface 122 has at least one inflection point, such as the second inflection point 123, so that the incident angle of the off-axis light projecting onto the image plane 170 is reduced to further correct the off-axis aberrations.

Besides, the photographing optical lens assembly 10 according to the present disclosure further comprises an image sensor 172 on the image plane 170, and satisfies at least one of the following conditions:

$-0.4<R_2/R_1<0.0$ (Condition 5):

$0.05<(R_4-R_3)/(R_4+R_3)<0.19$ (Condition 6):

$0<f/f_2<0.6$ (Condition 7):

$0.15$ millimeter (mm) $<CT_2<0.35$ mm (Condition 8):

$0.6<(SAG_{22})/Y_{22}<0.7$ (Condition 9):

$TTL/ImgH<2.40$ (Condition 10):

Wherein $R_1$ is the curvature radius of the object-side surface 111, $R_2$ is the curvature radius of the image-side surface 112, $R_3$ is the curvature radius of the object-side surface 121, $R_4$ is the curvature radius of the image-side surface 122, and $f_2$ is the focal length of the second lens element 120, $Y_{22}$ is the largest vertical distance from a position where the off-axis light passing through the image-side surface 122 to the optical axis, and $SAG_{22}$ is a horizontal distance between a position on the image-side surface 112 of the second lens element 122 $Y_{22}$ away from the optical axis and a plane in tangency with the image-side surface of the second lens element 120 on the optical axis. ImgH is a half of the length of the diagonal line of an effective photosensitive area of the image sensor.

When the photographing optical lens assembly 10 of the present disclosure satisfies Condition 5, the spherical aberration of the photographing optical lens assembly 10 is corrected. When the photographing optical lens assembly 10 satisfies Condition 6, the astigmatism and the high-order aberration is corrected. When the photographing optical lens assembly 10 satisfies Condition 7, the refractive power of the second lens element 120 is proper, so that the overall positive refractive power of the photographing optical lens assembly 10 is well distributed to the first lens element 110 and the second lens element 120, thereby the sensitivity of the photographing optical lens assembly 10 is reduced. When the photographing optical lens assembly 10 satisfies Condition 8, the thickness of the second lens element 120 is favorable for assembling the photographing optical lens assembly 10.

When the photographing optical lens assembly 10 according to the present disclosure satisfies Condition 9, the curvature of the second lens element 120 is favorable for manufacturing the second lens element 120 and reducing the size of the photographing optical lens assembly 10. Satisfaction of Condition 10 is favorable for reducing the size of the photographing optical lens assembly 10, so that the photographing optical lens assembly 10 is suitable for being assembled in a compact and movable electric device.

In the photographing optical lens assembly 10 of the present disclosure, all lenses may be made of glass or plastic. If a lens is made of glass, there is more freedom in distributing the refractive power. If a lens is made of plastic, the production cost is effectively reduced. In addition, the surfaces of the lens can be aspheric and easily made into aspherical profiles, allowing more design parameter freedom which can reduce aberrations and total number of the lens elements required within a lens assembly in order to produce high quality images, so that the total track length of the assembly can be reduced effectively.

In the photographing optical lens assembly 10 of the present disclosure, a convex surface of a lens means the surface of the lens is convex at a paraxial site. A concave surface of a lens means the surface of the lens is concave at a paraxial site. In addition, at least one stop may be disposed within the photographing optical lens assembly 10 to reduce the occurrence of unwanted rays (such as flare stops), to adjust the field of view (such as field stops), or for other means to improve the image quality.

As for the photographing optical lens assembly 10 of the present disclosure, the specific schemes are further described with the following embodiments. Parameters in the embodiments are defined as follows: Fno is the f-number of the photographing optical lens assembly, and HFOV is a half of the maximal viewing angle in the photographing optical lens assembly. The aspheric surface in the embodiments may be represented by, but not limited to, the following aspheric surface equation (Formula ASP):

$$X(Y) = (Y^2/R)/(1+sqrt(1-(1+k)*(Y/R)^2)) + \sum_i (Ai)*(Y^i)$$

Wherein Y is the distance from the point on the curve of the aspheric surface to the optical axis, X is the height of a point on the aspheric surface at a distance Y from the optical axis relative to the tangential plane at the aspheric surface vertex, k is a conic factor, Ai is an $i^{th}$ order aspheric surface coefficient, and in the embodiments, i may be, but is not limited to, 4, 6, 8, 10, 12, 14 and 16.

The First Embodiment (Embodiment 1)

FIG. 1A is a schematic structural view of a first embodiment of a photographing optical lens assembly according to the present disclosure. As shown in FIG. 1A, the photographing optical lens assembly 10 comprises, in order from the object side to the image side (from left to right in FIG. 1A), the aperture stop 100, the first lens element 110, the second lens element 120, the infrared filter 160, and the image plane 170.

In this embodiment, the wavelength of the light received by the photographing optical lens assembly 10 is, for example, but not limited to 587.6 nm. In some embodiments, the wavelength of the light received by the photographing optical lens assembly 10 may be adjusted according to actual requirements.

Furthermore, the first lens element 110 and the second lens element 120 are aspheric, and the aspheric surfaces of the present disclosure may satisfy Condition ASP, but are not limited thereto. As for the parameters of the aspheric surfaces, reference is made to Table 1-1 below.

TABLE 1-1

Aspheric Coefficients

| Surface# | 2 | 3 | 4 | 5 |
|---|---|---|---|---|
| k | −2.00000E+02 | −7.93744E−01 | −2.67532E+00 | −1.51163E+00 |
| $A_4$ | 9.30168E−01 | −2.10915E−01 | −9.30045E+00 | −1.15566E+00 |
| $A_6$ | −1.53228E+01 | −2.22205E+00 | 4.04906E+01 | −9.89879E−01 |
| $A_8$ | 9.36611E+01 | 5.64719E−01 | −7.66919E+01 | 1.04549E+01 |
| $A_{10}$ | −3.13342E+02 | 4.73052E+01 | 2.28284E+02 | 3.68166E+01 |
| $A_{12}$ | −3.34277E+02 | −2.16834E+02 | −8.49678E+02 | −1.57796E+02 |
| $A_{14}$ | 3.54106E+01 | 3.22517E+02 | 1.13088E+03 | 1.58002E+02 |
| $A_{16}$ | 2.19413E+03 | −1.52754E+02 | — | −2.87437E+01 |

The object-side surface 111 has at least one inflection point, such as the first inflection point 113, and the image-side surface 122 also has one inflection point, such as the second inflection point 123, so that the incident angle of the off-axis light projecting onto the image plane 170 is reduced to further correct the off-axis aberrations.

As for the parameters of the aspheric surfaces, reference is made to Table 1-2 below.

TABLE 1-2

Embodiment 1
f = 1.53 mm, Fno = 2.54, HFOV = 32.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.016 | | | | |
| 2 | Lens 1 | 2.33963(ASP) | 0.793 | Plastic | 1.544 | 55.9 | 1.10 |
| 3 | | −0.71201(ASP) | 0.501 | | | | |
| 4 | Lens 2 | −0.29402(ASP) | 0.300 | Plastic | 1.632 | 23.4 | 54.44 |
| 5 | | −0.40672(ASP) | 0.100 | | | | |
| 6 | IR-filter | Plano | 0.400 | Glass | 1.517 | 64.2 | — |
| 7 | | Plano | 0.302 | | | | |
| 8 | Image | Plano | — | | | | |

Note:
Reference wavelength is d-line 587.6 nm

The content of Table 1-3 may be deduced from Table 1-2.

TABLE 1-3

Embodiment 1

| | |
|---|---|
| f (mm) | 1.53 |
| Fno | 2.45 |
| HFOV(deg.) | 32.5 |
| $V_1-V_2$ | 32.50 |
| $CT_1/f$ | 0.52 |
| $CT_2/T_{12}$ | 0.60 |
| $CT_2$ (mm) | 0.300 |
| $R_2/R_1$ | −0.30 |
| $(R_4 - R_3)/(R_4 + R_3)$ | 0.16 |
| $f/f_2$ | 0.03 |
| $(SAG_{22})/Y_{22}$ | 0.64 |
| SL/TTL | 1.01 |
| TTL/ImgH | 2.26 |

In this embodiment of the photographing optical lens assembly 10, the optimal balance between reducing the volume and improving the image quality of the photographing optical lens assembly is achieved since $CT_2/T_{12}$ equals 0.60, satisfying Condition 1. The difficulty to manufacture the first lens element 110 is lowered and the yield rate of the first lens element 110 is raised since $CT_1/f$ equals 0.52, satisfying Condition 2. The chromatic aberration of the photographing optical lens assembly is corrected since $V_1-V_2$ equals 32.5, satisfying Condition 3. A good balance between pursuing the telecentric feature and a wide field of view of the photographing optical lens assembly is achieved since SL/TTL equals 1.01, satisfying Condition 4.

The spherical aberration of the photographing optical lens assembly 10 is corrected since $R_2/R_1$ equals −0.30, satisfying Condition 5. The astigmatism and the high-order aberration of the photographing optical lens assembly 10 are corrected since $(R_4-R_3)/(R_4+R_3)$ equals 0.16, satisfying Condition 6. Since $f/f_2$ equals 0.03, satisfying Condition 7, the overall positive refractive power of the photographing optical lens assembly 10 is well distributed to the first lens element 110 and the second lens element 120 so that the sensitivity of the photographing optical lens assembly 10 is lowered.

The photographing optical lens assembly 10 may be assembled easily since $CT_2$ equals 0.300 mm, satisfying Condition 8. The curvature of the second lens element 120 is proper and favorable for manufacturing of the second lens element 120 and for reducing the size of the photographing optical lens assembly 10 since $(SAG_{22})/Y_{22}$ equals 0.64, satisfying Condition 9. Since TTL/ImgH equals 2.26, satisfying Condition 10, the size of the photographing optical lens assembly 10 is reduced so that the photographing optical lens assembly 10 is suitable for being assembled in a compact and movable electric device.

FIG. 1B is a schematic view of longitudinal spherical aberration curves when the lights having wavelengths of 486.1 nm, 587.6 nm, and 656.3 nm are respectively projected in the photographing optical lens assembly in FIG. 1A. The longitudinal spherical aberration curves of the lights having the wavelengths of 486.1 nm, 587.6 nm, and 656.3 nm in the photographing optical lens assembly 10 are respectively indicated by a solid line L, a dashed line M, and a dotted line N in FIG. 1B. Horizontal axis is the focus position (millimeter, mm), and vertical axis is the normalized entrance pupil or the aperture value. In other words, after the light enters the photographing optical lens assembly 10, the differences between the focus positions of the paraxial light (the longitudinal coordinate is close to 0) and the fringe light (the longitudinal coordinate is close to 1) can be observed from the longitudinal spherical aberration curves. It can be observed from FIG. 1B that, no matter the wavelength of the light received by the photographing optical lens assembly 10 of this embodiment is 486.1 nm, 587.6 nm, or 656.3 nm, the longitudinal spherical aberration generated by the photographing optical lens assembly 10 is within the range of −0.05 mm to 0.02 mm.

Figure 2A:
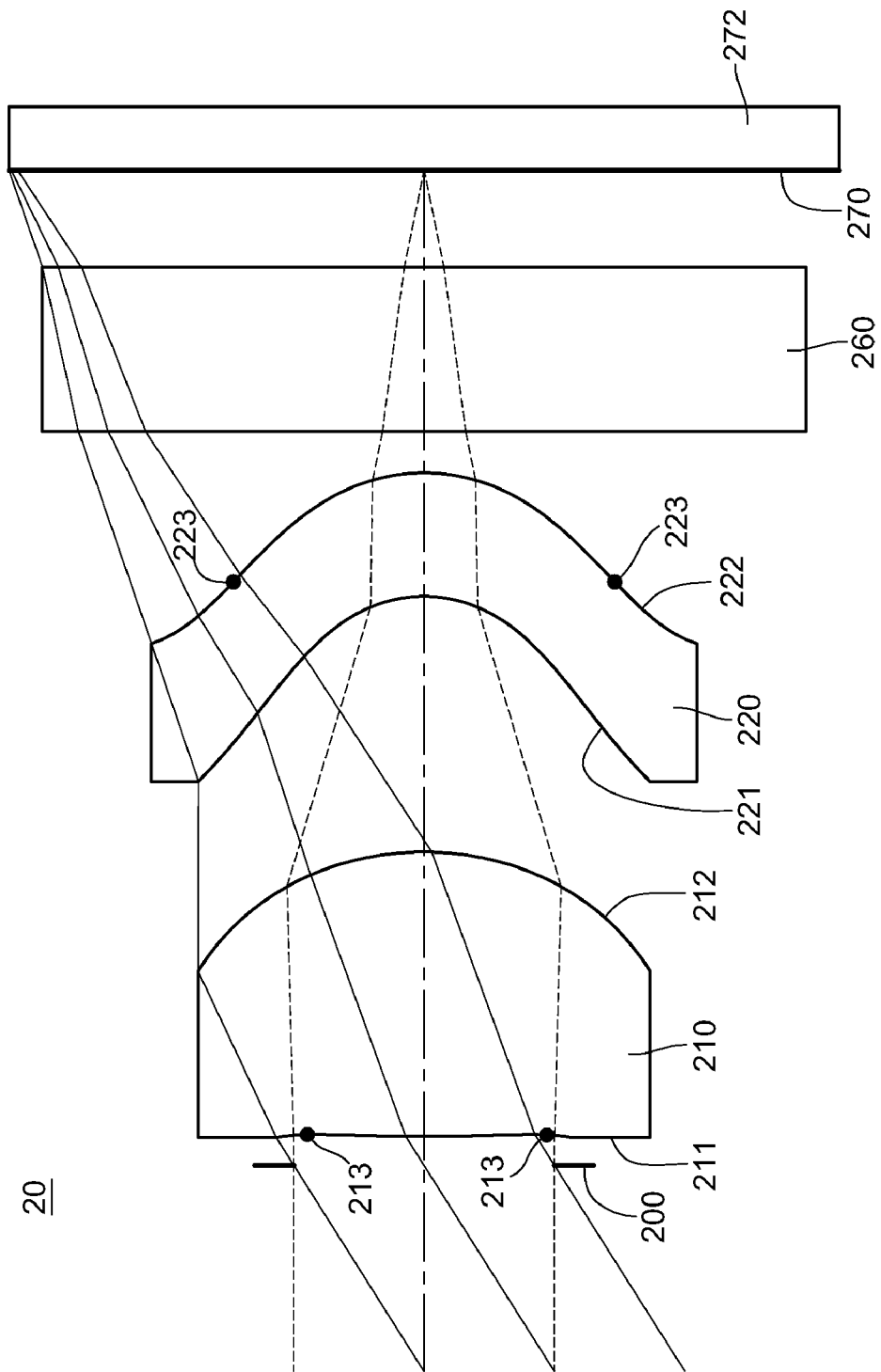
FIG. 2A is a schematic structural view of a second embodiment of a photographing optical lens assembly according to the present invention.
Figures 2B, 2C, 2D:
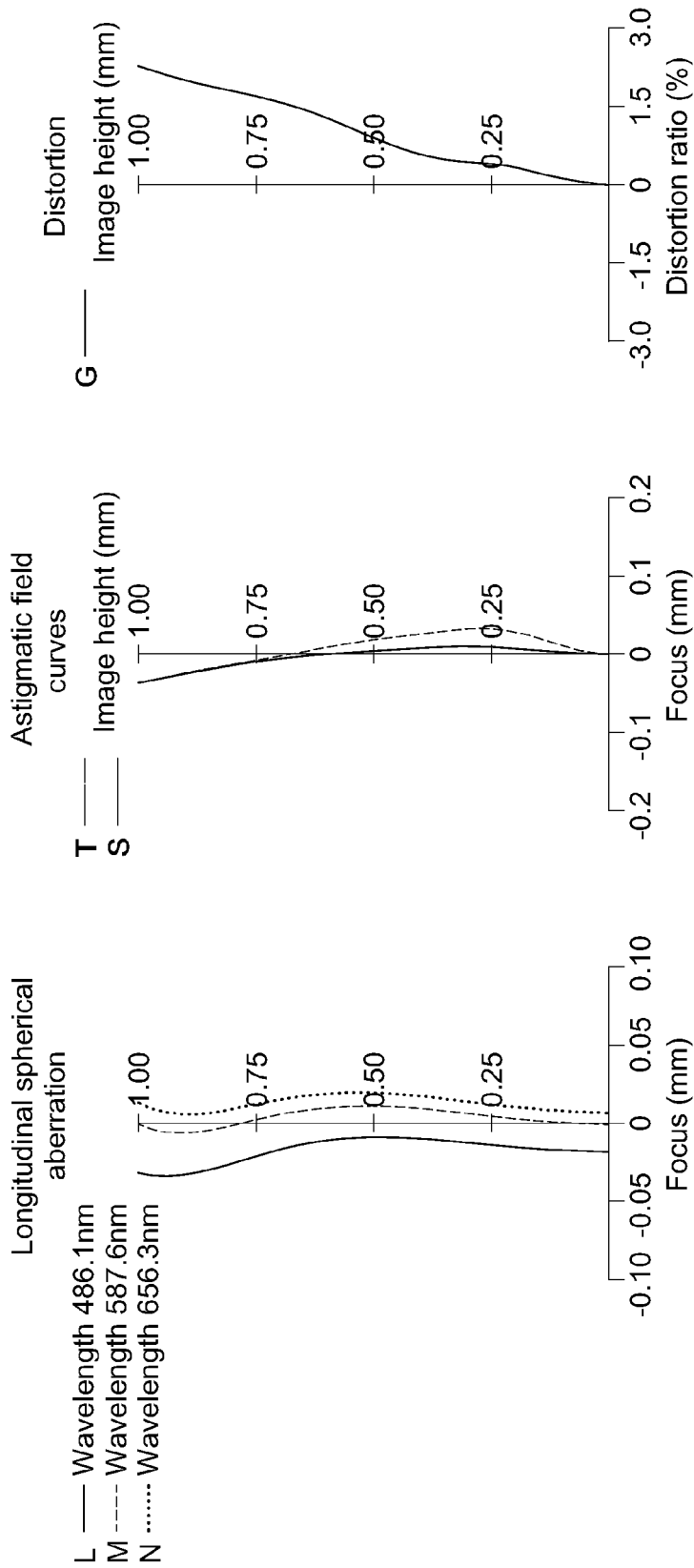
FIG. 2B is a schematic view of longitudinal spherical aberration curves when the lights having wavelengths of 486.1 nm, 587.6 nm, and 656.3 nm are respectively projected in the photographing optical lens assembly in FIG. 2A.
FIG. 2C is a schematic view of astigmatic field curves when the light having the wavelength of 587.6 nm is projected in the photographing optical lens assembly in FIG. 2A.
FIG. 2D is a schematic view of a distortion curve when the light having the wavelength of 587.6 nm is projected in the photographing optical lens assembly in FIG. 2A.
Figure 3A:
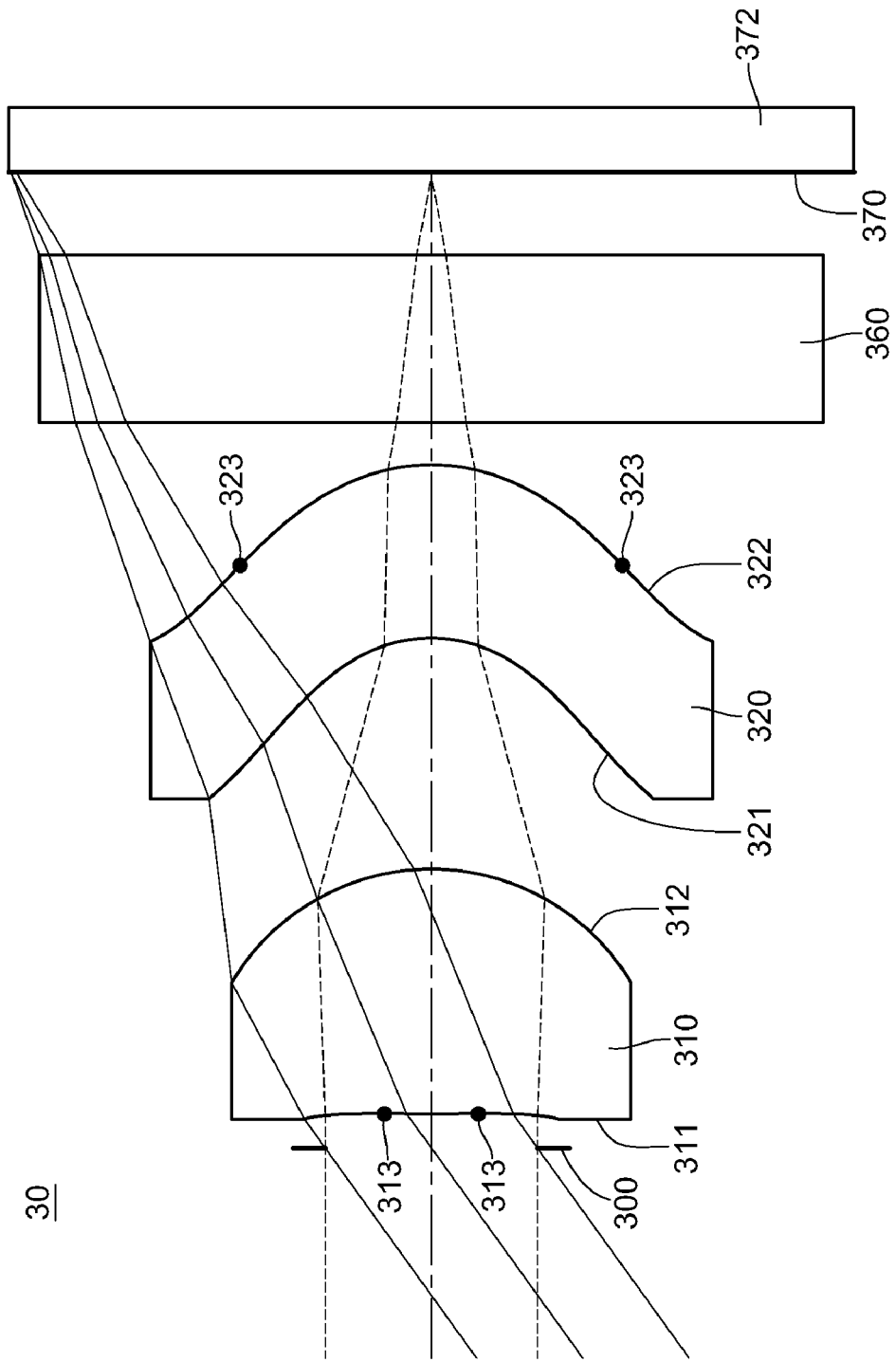
FIG. 3A is a schematic structural view of a third embodiment of a photographing optical lens assembly according to the present disclosure.
Figure 4A:
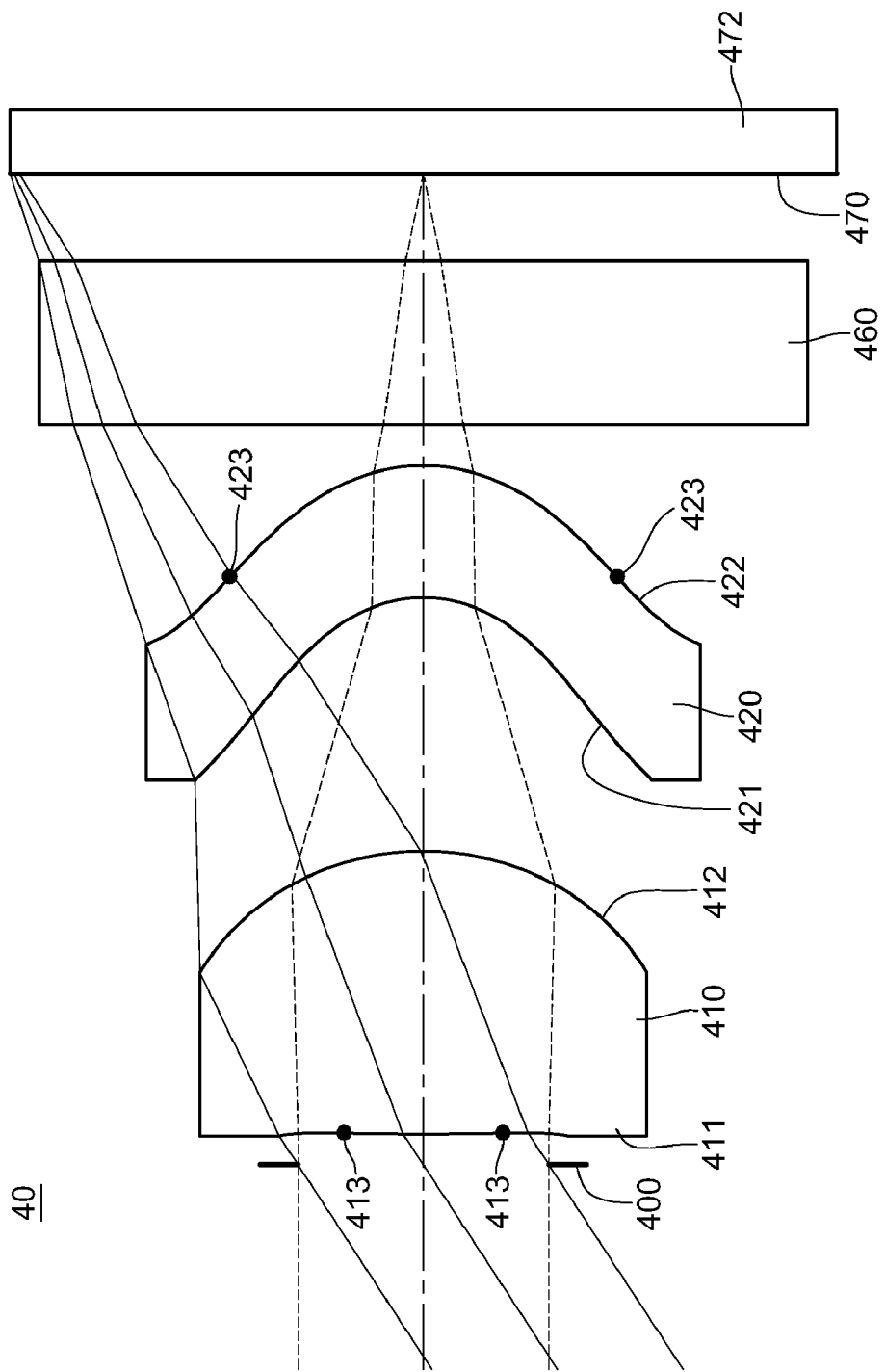
FIG. 4A is a schematic structural view of a fourth embodiment of a photographing optical lens assembly according to the present disclosure.
Figures 4B, 4C, 4D:
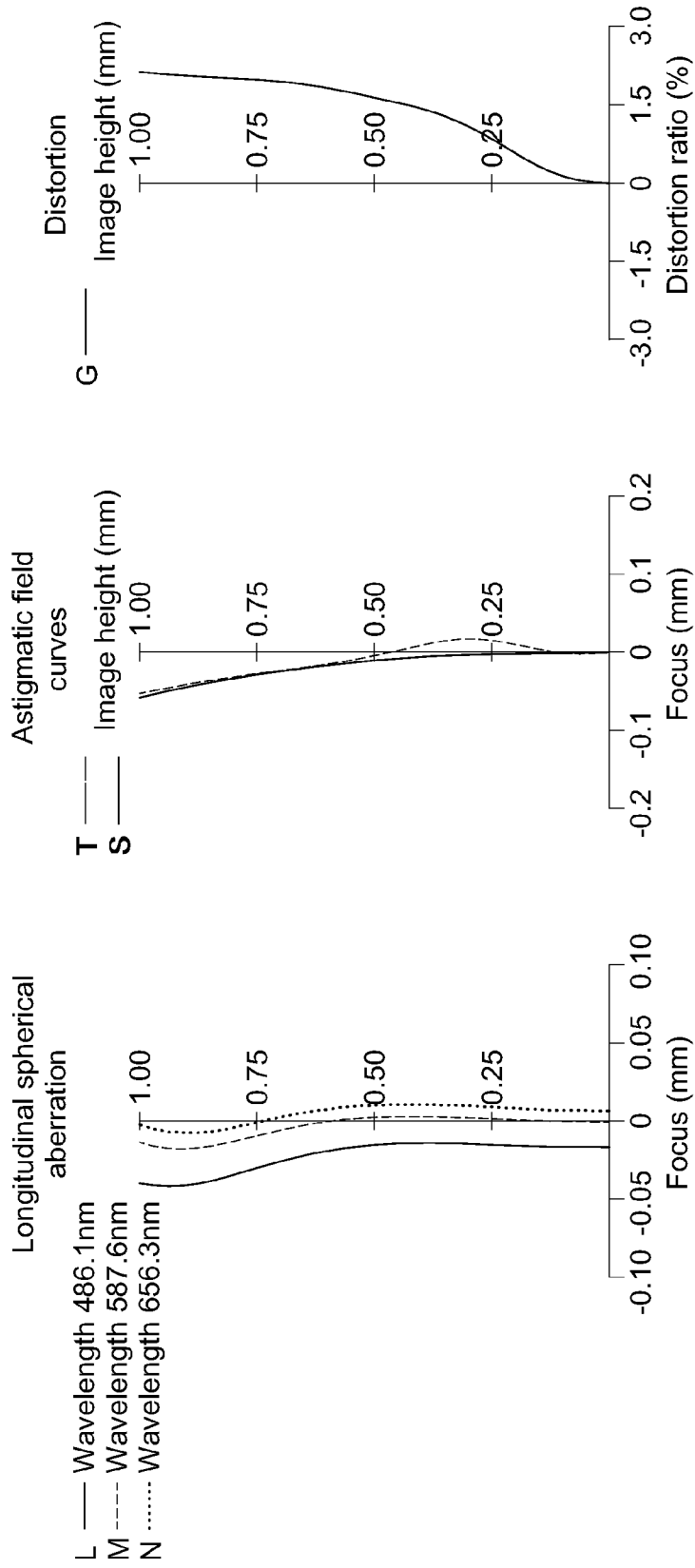
FIG. 4B is a schematic view of longitudinal spherical aberration curves when the lights having wavelengths of 486.1 nm, 587.6 nm, and 656.3 nm are respectively projected in the photographing optical lens assembly in FIG. 4A.
FIG. 4C is a schematic view of astigmatic field curves when the light having the wavelength of 587.6 nm is projected in the photographing optical lens assembly in FIG. 4A.
FIG. 4D is a schematic view of a distortion curve when the light having the wavelength of 587.6 nm is projected in the photographing optical lens assembly in FIG. 4A.

In the second embodiment to the fourth embodiment and the schematic views of the longitudinal spherical aberration curves in FIGS. 2B, 3B, and 4B, the solid line L, the dashed line M, and the dotted line N respectively indicate the longitudinal spherical aberration curves of the lights having the wavelengths of 486.1 nm, 587.6 nm, and 656.3 nm, which will not be repeated herein for the sake of conciseness.

FIG. 1C is a schematic view of astigmatic field curves when the light having the wavelength of 587.6 nm is projected in the photographing optical lens assembly 10 in FIG. 1A. The astigmatic field curve of a tangential plane is a dashed line T in FIG. 1C. The astigmatic field curve of a sagittal plane is a solid line S in FIG. 1C. Horizontal axis is the focus position (mm), and vertical axis is image height (mm). The differences in focus position due to different curvatures of the tangential plane and the sagittal plane can be observed from the astigmatic field curves. It can be observed from FIG. 1C that, the astigmatic field curvature of the tangential plane generated when the light having the wavelength of 587.6 nm is projected in the photographing optical lens assembly 10 is within a range of −0.100 mm to 0.025 mm, and the astigmatic field curvature of the sagittal plane is within a range of −0.100 mm to 0.0 mm.

In the second embodiment to the fourth embodiment and the schematic views of the astigmatic field curves in FIGS. 2C, 3C, and 4C, the solid line S indicates the astigmatic field curve of the sagittal plane, and the dashed line T indicates the astigmatic field curve of the tangential plane, which will not be repeated herein for the sake of conciseness.

FIG. 1D is a schematic view of a distortion curve when the light having the wavelength of 587.6 nm is projected in the photographing optical lens assembly 10 in FIG. 1A. Horizontal axis is distortion ratio (%), and vertical axis is image height (mm). In other words, the differences in distortion ratio caused by different image heights can be seen from the distortion curve G. It can be observed from FIG. 1D that, the distortion ratio generated when the light having the wavelength of 587.6 nm is projected in the photographing optical lens assembly 10 is within a range of 0% to 2.25%. As shown in FIGS. 1B to 1D, the photographing optical lens assembly 10, designed according to the first embodiment, is capable of effectively correcting various aberrations.

In the second embodiment to the fourth embodiment and the schematic views of the distortion curves in FIGS. 2D, 3D, and 4D, the solid line G indicates the distortion curve of the light having the wavelength of 587.6 nm, which will not be repeated herein for the sake of conciseness.

It should be noted that, the distortion curves and the astigmatic field curves of the light having wavelengths of 486.1 nm and 656.3 nm in the photographing optical lens assembly 10 are close to the distortion curve and the astigmatic field curve of the wavelength of 587.6 nm. In order to prevent the possible visual confusion about FIGS. 1C and 1D, the distortion curve and the astigmatic field curves of the light wavelengths of 486.1 nm and 656.3 nm are not shown in FIGS. 1C and 1D, and the same applies throughout the second embodiment to the fourth embodiment.

The Second Embodiment(Embodiment 2)

FIG. 2A is a schematic structural view of a second embodiment of a photographing optical lens assembly according to the present disclosure. The specific implementation is substantially the same as that in the first embodiment, and the elements in the second embodiment are the same as those in the first embodiment, so that the element symbols all begin with "2" as the hundredth digit, which represents that the elements have the same function or structure. For the sake of conciseness, only the differences are illustrated below, and the similar parts will not be repeated herein.

In this embodiment, for example, the wavelength of the light received by the photographing optical lens assembly 20 is 587.6 nm, but the wavelength of the light received by the photographing optical lens assembly 20 may be adjusted according to actual requirements, and is not limited to the wavelength value mentioned above.

Furthermore, a first lens element 210 and a second lens element 220 are aspheric, and the aspheric surfaces, for example, satisfy the Condition ASP, but are not limited thereto. As for the parameters of the aspheric surfaces, reference is made to Table 2-1 below.

TABLE 2-1

| Surface# | Aspheric Coefficients | | | |
| --- | --- | --- | --- | --- |
| | 2 | 3 | 4 | 5 |
| k | −2.00000E+02 | −4.70620E−01 | −1.98272E+00 | −9.84239E−01 |
| $A_4$ | −3.92224E−01 | −2.78636E−01 | −8.01298E+00 | −1.31648E+00 |
| $A_6$ | −2.08511E+00 | −1.09906E+00 | 3.49250E+01 | 1.75410E+00 |
| $A_8$ | −2.39756E+00 | −5.50572E+00 | −6.83052E+01 | 6.89798E+00 |
| $A_{10}$ | −7.29603E+01 | 6.06858E+01 | 2.29668E+02 | 3.36723E+01 |
| $A_{12}$ | −3.34277E+02 | −2.26641E+02 | −8.07920E+02 | −1.54059E+02 |
| $A_{14}$ | 3.54109E+01 | 2.95757E+02 | 9.95366E+02 | 1.79213E+02 |
| $A_{16}$ | 2.19413E+03 | −1.59284E+02 | — | −5.80932E+01 |

In this embodiment, the first lens element 210 has positive refractive power, and the second lens element 220 also has positive refractive power. The object-side surface 211 and the image-side surface 212 are convex and the object-side surface 221 is concave, and the image-side surface 222 is convex. The object-side surface 211 has at least one inflection point, such as a first inflection point 213, and the image-side surface 222 also has one inflection point, such as a second inflection point 223, so that the incident angle of the off-axis light projecting onto an image plane 270 is reduced to further correct the off-axis aberrations.

The detailed data of the photographing optical lens assembly 20 is as shown in Table 2-2 below.

TABLE 2-2

Embodiment 2
f = 1.55 mm, Fno = 2.45, HFOV = 32.3 deg.

| Surface # | | Curvature Radius | Thickness | Material | Index | Abbe # | Focal length |
| --- | --- | --- | --- | --- | --- | --- | --- |
| 0 | Object | Plano | Infinity | | | | |
| 1 | Ape. Stop | Plano | 0.070 | | | | |
| 2 | Lens 1 | 3.94940(ASP) | 0.690 | Plastic | 1.544 | 55.9 | 1.18 |
| 3 | | −0.72037(ASP) | 0.620 | | | | |
| 4 | Lens 2 | −0.34214(ASP) | 0.300 | Plastic | 1.583 | 30.2 | 49.85 |
| 5 | | −0.44741(ASP) | 0.100 | | | | |

TABLE 2-2-continued

Embodiment 2
f = 1.55 mm, Fno = 2.45, HFOV = 32.3 deg.

| Surface # | | Curvature Radius | Thickness | Material | Index | Abbe # | Focal length |
|---|---|---|---|---|---|---|---|
| 6 | IR-filter | Plano | 0.400 | Glass | 1.517 | 64.2 | — |
| 7 | | Plano | 0.234 | | | | |
| 8 | Image | Plano | — | | | | |

Note:
Reference wavelength is d-line 587.6 nm

The content of Table 2-3 may be deduced from Table 2-2.

TABLE 2-3

| Embodiment 2 | |
|---|---|
| f (mm) | 1.55 |
| Fno | 2.45 |
| HFOV(deg.) | 32.3 |
| $V_1$-$V_2$ | 25.70 |
| $CT_1/f$ | 0.45 |
| $CT_2/T_{12}$ | 0.48 |
| $CT_2$ (mm) | 0.300 |
| $R_2/R_1$ | −0.18 |
| $(R_4 - R_3)/(R_4 + R_3)$ | 0.13 |
| $f/f_2$ | 0.03 |
| $(SAG_{22})/Y_{22}$ | 0.63 |
| SL/TTL | 1.03 |
| TTL/ImgH | 2.21 |

FIG. 2B is a schematic view of longitudinal spherical aberration curves when the lights having wavelengths of 486.1 nm, 587.6 nm, and 656.3 nm are respectively projected in the photographing optical lens assembly 20 in FIG. 2A. It can be observed from FIG. 2B that no matter the wavelength of the light received by the photographing optical lens assembly 20 of this embodiment is 486.1 nm, 587.6 nm, or 656.3 nm, the longitudinal spherical aberration generated by the photographing optical lens assembly 20 is within the range of −0.025 mm to 0.025 mm.

FIG. 2C is a schematic view of astigmatic field curves when the light having the wavelength of 587.6 nm is projected in the photographing optical lens assembly 20 in FIG. 2A. It can be observed from FIG. 2C that, when the light having the wavelength of 587.6 nm is projected in the photographing optical lens assembly 20, the astigmatic field curvature of the tangential plane is within a range of −0.05 mm to 0.05 mm, and the astigmatic field curvature of the sagittal plane is within a range of −0.05 mm to 0.025 mm.

FIG. 2D is a schematic view of a distortion curve when the light having the wavelength of 587.6 nm is projected in the photographing optical lens assembly 20 in FIG. 2A. It can be observed from FIG. 2D that, the distortion ratio generated when the light having the wavelength of 587.6 nm is projected in the photographing optical lens assembly 20 is within a range of 0.0% to 2.5%. As shown in FIGS. 2B to 2D, the photographing optical lens assembly 20, designed according to the second embodiment, is capable of effectively correcting various aberrations.

The Third Embodiment (Embodiment 3)

FIG. 3A is a schematic structural view of a third embodiment of a photographing optical lens assembly according to the present disclosure. The specific implementation is substantially the same as that in the first embodiment, and the elements in the third embodiment are the same as those in the first embodiment, so that the element symbols all begin with "3" as the hundredth digit, which represents that the elements have the same function or structure. For the sake of conciseness, only the differences are illustrated below, and the similar parts will not be repeated herein.

In this embodiment, for example, the wavelength of the light received by the photographing optical lens assembly 30 is 587.6 nm, but the wavelength of the light received by the photographing optical lens assembly 30 may be adjusted according to actual requirements, and is not limited to the wavelength value mentioned above.

Furthermore, a first lens element 310 and a second lens element 320 are aspheric, and the aspheric surfaces, for example, satisfy the Condition ASP, but are not limited thereto. As for the parameters of the aspheric surfaces, reference is made to Table 3-1 below.

TABLE 3-1

| | Aspheric Coefficients | | | |
|---|---|---|---|---|
| Surface# | 2 | 3 | 4 | 5 |
| k | −4.68411E+01 | −4.35388E−01 | −2.64224E+00 | −1.50101E+00 |
| $A_4$ | −1.67478E+00 | −2.54184E−01 | −8.09202E+00 | −8.53226E−01 |
| $A_6$ | 1.03987E+01 | −1.00669E+00 | 3.97972E+01 | −2.12583E+00 |
| $A_8$ | −2.05415E+02 | −7.54356E+00 | −9.55881E+01 | 8.37572E+00 |
| $A_{10}$ | 6.86656E+02 | 7.61057E+01 | 2.64102E+02 | 3.82907E+01 |
| $A_{12}$ | −3.50363E+02 | −3.40556E+02 | −7.35563E+02 | −1.47398E+02 |
| $A_{14}$ | 2.25433E+01 | 2.90194E+02 | 8.61004E+02 | 1.69378E+02 |
| $A_{16}$ | 2.20599E+03 | −2.27770E+02 | — | −6.42944E+01 |

In this embodiment, the first lens element 310 has positive refractive power, and the second lens element 320 also has positive refractive power. The object-side surface 311 and the image-side surface 312 are convex and the object-side surface 321 is concave, and the image-side surface 322 is convex. The object-side surface 311 has at least one inflection point, such as a first inflection point 313, and the image-side surface 322 also has one inflection point, such as a second inflection point 323, so that the incident angle of the off-axis light projecting onto an image plane 370 is reduced to further correct the off-axis aberrations.

The detailed data of the photographing optical lens assembly 30 is as shown in Table 3-2 below.

TABLE 3-2

Embodiment 3
f = 1.36 mm, Fno = 2.70, HFOV = 35.8 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.081 | | | | |
| 2 | Lens 1 | 10.53940(ASP) | 0.583 | Plastic | 1.514 | 56.8 | 1.03 |
| 3 | | −0.54919(ASP) | 0.550 | | | | |
| 4 | Lens 2 | −0.35283(ASP) | 0.413 | Plastic | 1.634 | 23.8 | 4.12 |
| 5 | | −0.45196(ASP) | 0.100 | | | | |
| 6 | IR-filter | Plano | 0.400 | Glass | 1.517 | 64.2 | — |
| 7 | | Plano | 0.196 | | | | |
| 8 | Image | Plano | — | | | | |

Note:
Reference wavelength is d-line 587.6 nm

The content of Table 3-3 may be deduced from Table 3-2.

TABLE 3-3

Embodiment 3

| f (mm) | 1.36 |
|---|---|
| Fno | 2.70 |
| HFOV(deg.) | 35.8 |
| $V_1-V_2$ | 33.00 |
| $CT_1/f$ | 0.43 |
| $CT_2/T_{12}$ | 0.75 |
| $CT_2$ (mm) | 0.413 |
| $R_2/R_1$ | −0.05 |
| $(R_4 - R_3)/(R_4 + R_3)$ | 0.12 |
| $f/f_2$ | 0.33 |
| $(SAG_{22}/Y_{22})$ | 0.63 |
| SL/TTL | 1.04 |
| TTL/ImgH | 2.11 |

FIG. 3B is a schematic view of longitudinal spherical aberration curves when the lights having wavelengths of 486.1 nm, 587.6 nm, and 656.3 nm are respectively projected in the photographing optical lens assembly 30 in FIG. 3A. It can be observed from FIG. 3B that no matter the wavelength of the light received by the photographing optical lens assembly 30 of this embodiment is 486.1 nm, 587.6 nm, or 656.3 nm, the longitudinal spherical aberration generated by the photographing optical lens assembly 30 is within the range of −0.025 mm to 0.025 mm.

FIG. 3C is a schematic view of astigmatic field curves when the light having the wavelength of 587.6 nm is projected in the photographing optical lens assembly 30 in FIG. 3A. It can be observed from FIG. 3C that, when the light having the wavelength of 587.6 nm is projected in the photographing optical lens assembly 30, the astigmatic field curvature of the tangential plane is within a range of −0.050 mm to 0.050 mm, and the astigmatic field curvature of the sagittal plane is within a range of −0.050 mm to 0.025 mm.

FIG. 3D is a schematic view of a distortion curve when the light having the wavelength of 587.6 nm is projected in the photographing optical lens assembly 30 in FIG. 3A. It can be observed from FIG. 3D that, the distortion ratio generated when the light having the wavelength of 587.6 nm is projected in the photographing optical lens assembly 30 is within a range of 0.0% to 2.0%. As shown in FIGS. 3B to 3D, the photographing optical lens assembly 30, designed according to the third embodiment, is capable of effectively correcting various aberrations.

The Fourth Embodiment (Embodiment 4)

FIG. 4A is a schematic structural view of a fourth embodiment of a photographing optical lens assembly according to the present disclosure. The specific implementation is substantially the same as that in the first embodiment, and the elements in the fourth embodiment are the same as those in the first embodiment, so that the element symbols all begin with "4" as the hundredth digit, which represents that the elements have the same function or structure. For the sake of conciseness, only the differences are illustrated below, and the similar parts will not be repeated herein.

In this embodiment, for example, the wavelength of the light received by the photographing optical lens assembly 40 is 587.6 nm, but the wavelength of the light received by the photographing optical lens assembly 40 may be adjusted according to actual requirements, and is not limited to the wavelength value mentioned above.

Furthermore, a first lens element 410 and a second lens element 420 are aspheric, and the aspheric surfaces, for example, satisfy the Condition ASP, but are not limited thereto. As for the parameters of the aspheric surfaces, reference is made to Table 4-1 below.

TABLE 4-1

Aspheric Coefficients

| Surface# | 2 | 3 | 4 | 5 |
|---|---|---|---|---|
| K | −1.72465E+02 | −5.80032E−01 | −3.22677E+00 | −1.43718E+00 |
| $A_4$ | −6.06983E−01 | −2.88366E−01 | −8.95620E+00 | −9.49368E−01 |
| $A_6$ | −1.41354E−01 | −3.08513E−01 | 3.89266E+01 | −2.04793E+00 |
| $A_8$ | −1.71250E+01 | −1.12634E+01 | −8.93962E+01 | 9.70601E+00 |
| $A_{10}$ | −3.71417E+01 | 7.92201E+01 | 2.73913E+01 | 3.82520E+01 |
| $A_{12}$ | −3.34277E+02 | −2.52061E+02 | −7.60622E+02 | −1.49921E+02 |
| $A_{14}$ | 3.54110E+01 | 2.95478E+02 | 8.16661E+02 | 1.61386E+02 |
| $A_{16}$ | 2.19413E+03 | −1.53049E+02 | — | −5.23611E+01 |

In this embodiment, the first lens element 410 has positive refractive power, and the second lens element 420 has positive refractive power. The object-side surface 411 and the image-side surface 412 are convex and the object-side surface 421 is concave, and the image-side surface 422 is convex. The object-side surface 411 has at least one inflection point, such as a first inflection point 413, and the image-side surface 422 also has one inflection point, such as a second inflection point 423, so that the incident angle of the off-axis light projecting onto an image plane 470 is reduced to further correct the off-axis aberrations.

The detailed data of the photographing optical lens assembly 40 is as shown in Table 4-2 below.

TABLE 4-2

Embodiment 4
f = 1.50 mm, Fno = 2.45, HFOV = 33.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.075 | | | | |
| 2 | Lens 1 | 4.29580(ASP) | 0.692 | Plastic | 1.530 | 55.8 | 1.16 |
| 3 | | −0.68025(ASP) | 0.620 | | | | |
| 4 | Lens 2 | −0.33583(ASP) | 0.323 | Plastic | 1.614 | 25.6 | 7.80 |
| 5 | | −0.42867(ASP) | 0.100 | | | | |
| 6 | IR-filter | Plano | 0.400 | Glass | 1.517 | 64.2 | — |
| 7 | | Plano | 0.213 | | | | |
| 8t | Image | Plano | — | | | | |

Note:
Reference wavelength is d-line 587.6 nm

The content of Table 4-3 may be deduced from Table 4-2.

TABLE 4-3

Embodiment 4

| f (mm) | 1.50 |
|---|---|
| Fno | 2.45 |
| HFOV(deg.) | 33.2 |
| $V_1$-$V_2$ | 30.20 |
| $CT_1/f$ | 0.46 |
| $CT_2/T_{12}$ | 0.52 |
| $CT_2$ (mm) | 0.323 |
| $R_2/R_1$ | −0.16 |
| $(R_4 - R_3)/(R_4 + R_3)$ | 0.12 |
| $f/f_2$ | 0.19 |
| $(SAG_{22})/Y_{22}$ | 0.65 |
| SL/TTL | 1.03 |
| TTL/ImgH | 2.21 |

FIG. 4B is a schematic view of longitudinal spherical aberration curves when the lights having wavelengths of 486.1 nm, 587.6 nm, and 656.3 nm are respectively projected in the photographing optical lens assembly 40 in FIG. 4A. It can be observed from FIG. 4B that, no matter the wavelength of the light received by the photographing optical lens assembly 40 of this embodiment is 486.1 nm, 587.6 nm, or 656.3 nm, the longitudinal spherical aberration generated by the photographing optical lens assembly 40 is within the range of −0.050 mm to 0.025 mm.

FIG. 4C is a schematic view of astigmatic field curves when the light having the wavelength of 587.6 nm is projected in the photographing optical lens assembly 40 in FIG. 4A. It can be observed from FIG. 4C that, when the light having the wavelength of 587.6 nm is projected in the photographing optical lens assembly 40, the astigmatic field curvature of the tangential plane generated is within a range of −0.050 mm to 0.025 mm, and the astigmatic field curvature of the sagittal plane is within a range of −0.050 mm to 0.0 mm.

FIG. 4D is a schematic view of a distortion curve when the light having the wavelength of 587.6 nm is projected in the photographing optical lens assembly 40 in FIG. 4A. It can be observed from FIG. 4D that, the distortion ratio generated when the light having the wavelength of 587.6 nm is projected in the photographing optical lens assembly 40 is within a range of 0.0% to 2.5%. As shown in FIGS. 4B to 4D, the photographing optical lens assembly 40, designed according to the fourth embodiment, is capable of effectively correcting various aberrations.

What is claimed is:

1. A photographing optical lens assembly, comprising, in order from an object side to an image side:

a first lens element with positive refractive power, wherein the object-side surface of the first lens element and the image-side surface of the first lens element are convex, and at least one of the object-side and the image-side surfaces of the first lens element is aspheric; and a second lens element with positive refractive power, wherein the object-side surface of the second lens element is concave, the image-side surface of the second lens element is convex, and the object-side surface and the image-side surfaces of the second lens element are aspheric;

wherein a thickness of the first lens element near an optical axis is $CT_1$, an axial distance between the first lens element and the second lens element is $T_{12}$, a thickness of the second lens element near the optical axis is $CT_2$, a focal length of the photographing optical lens assembly is f, an Abbe number of the first lens element is $V_1$, an Abbe number of the second lens element is $V_2$, the photographing optical lens assembly further comprises a stop and an image plane, an axial distance between the stop and the image plane is SL, an axial distance between the object-side surface of the first lens element and the image plane is TTL, and the following conditions are satisfied:

$0.25 < CT_2/T_{12} < 0.80;$ $0.30 < CT_1/f < 0.57;$ $20.0 < V_1-V_2 < 45.0;$ and $0.9 < SL/TTL < 1.2.$ 2. The photographing optical lens assembly according to claim 1, wherein the first lens element and the second lens element are made of plastic.

3. The photographing optical lens assembly according to claim 2, wherein there is at least one inflection point on the second lens element.

4. The photographing optical lens assembly according to claim 2, wherein a curvature radius of the object-side surface of the first lens element is $R_1$, a curvature radius of the image-side surface of the first lens element is $R_2$, and the photographing optical lens assembly satisfies the following condition: $-0.4 < R_2/R_1 < 0.0$.

5. The photographing optical lens assembly according to claim 4, wherein a curvature radius of the object-side surface of the second lens element is $R_3$, a curvature radius of the image-side surface of the second lens element is $R_4$, and the photographing optical lens assembly satisfies the following condition: $0.05 < (R_4-R_3)/(R_4+R_3) < 0.19$.

6. The photographing optical lens assembly according to claim 4, wherein a focal length of the second lens element is $f_2$, and the photographing optical lens assembly satisfies the following condition: $0 < f/f_2 < 0.2$.

7. The photographing optical lens assembly according to claim 4, further satisfying the following condition: $30.0 < V_1 - V_2 < 42.0$.

8. The photographing optical lens assembly according to claim 4, wherein there is at least one inflection point on the first lens element.

9. The photographing optical lens assembly according to claim 4, further satisfying the following condition: $0.15$ millimeter $(mm) < CT_2 < 0.35$ mm.

10. The photographing optical lens assembly according to claim 2, wherein a focal length of the second lens element is $f_2$, and the photographing optical lens assembly satisfies the following condition: $0 < f/f_2 < 0.6$.

11. The photographing optical lens assembly according to claim 10, further satisfying the following condition: $0.45 < CT_2/T_{12} < 0.65$.

12. The photographing optical lens assembly according to claim 10, further satisfying the following condition: $0 < f/f_2 < 0.2$.

13. The photographing optical lens assembly according to claim 10, further satisfying the following condition: $30.0 < V_1 - V_2 < 42.0$.

14. The photographing optical lens assembly according to claim 10, further comprising a largest vertical distance $Y_{22}$ from a position where an off-axis light passes through the image-side surface of the second lens element to the optical axis, a horizontal distance $SAG_{22}$ between a position on the image-side surface of the second lens element $Y_{22}$ away from the optical axis and a plane in tangency with the image-side surface of the second lens element on the optical axis, and the photographing optical lens assembly satisfies the following condition: $0.6 < SAG_{22}/Y_{22} < 0.7$.

15. The photographing optical lens assembly according to claim 10, further satisfying the following condition: $0.15$ mm $< CT_2 < 0.35$ mm.

16. The photographing optical lens assembly according to claim 2, further comprising an image sensor, wherein the image sensor is disposed on the image plane, a half of a diagonal line of an effective photosensitive area of the image sensor is ImgH, an axial distance between the object-side surface of the first lens element and the image plane is TTL, and the photographing optical lens assembly satisfies the following condition: $TTL/ImgH < 2.40$.

* * * * *